United States Patent
Itshaki et al.

(10) Patent No.: US 10,116,580 B2
(45) Date of Patent: Oct. 30, 2018

(54) SEAMLESS LOCATION AWARE NETWORK CONNECTIVITY

(75) Inventors: Ehud Mordechai Itshaki, Petach-Tikva (IL); Nir Nice, Kfar Veradim (IL); Eugene John Neystadt, Kfar-Saba (IL); Noam Gershon Ben-Yochanan, Petach-Tikva (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 787 days.

(21) Appl. No.: 12/163,046

(22) Filed: Jun. 27, 2008

(65) Prior Publication Data

US 2009/0327497 A1    Dec. 31, 2009

(51) Int. Cl.
*G06F 15/16*     (2006.01)
*H04L 12/911*    (2013.01)
*H04W 76/10*     (2018.01)

(52) U.S. Cl.
CPC ............ *H04L 47/70* (2013.01); *H04W 76/10* (2018.02)

(58) Field of Classification Search
CPC .......................... H04W 76/02; H04L 12/5695
USPC ......................................................... 709/227
See application file for complete search history.

(56) References Cited

U.S. PATENT DOCUMENTS

| | | |
|---|---|---|
| 6,563,800 B1 | 5/2003 | Salo et al. |
| 6,895,434 B1 | 5/2005 | Chandrupatla et al. |
| 6,957,249 B2 | 10/2005 | Salo et al. |
| 7,069,433 B1 | 6/2006 | Henry |
| 7,124,189 B2 | 10/2006 | Summers et al. |
| 7,127,742 B2 | 10/2006 | Kramer et al. |
| 7,131,141 B1 | 10/2006 | Blewett et al. |
| 7,324,528 B2 | 1/2008 | Szlam |
| 7,587,490 B2 * | 9/2009 | Guenther et al. ............. 709/224 |

(Continued)

FOREIGN PATENT DOCUMENTS

| | | |
|---|---|---|
| CN | 1604686 A | 4/2005 |
| JP | 2004-199414 A | 7/2004 |

(Continued)

OTHER PUBLICATIONS

"The First PPTP VPN Client for Palm", Jul. 2002, PDA cortex, p. 1.

(Continued)

*Primary Examiner* — Tonia L Dollinger
*Assistant Examiner* — Adam A Cooney

(57) ABSTRACT

Described is a technology by which a seamless automatic connection to an (e.g., corporate) network is made for a client device. Upon detecting a need for a connection to a network, such as by intercepting a communication directed towards a network destination, a list of available connection methods is automatically obtained based on the device's current location data (e.g., LAN or remote) and policy information. An available connection method from the list is selected, e.g., in order, and an attempt is made to establish a connection via that connection method. If the attempt fails, another attempt is made with a different connection method, and so on, until a connection method succeeds. Additional seamlessness from the user's perspective is provided via a credentials vault, by which stored credentials may be retrieved and used in association with the access method being attempted.

20 Claims, 5 Drawing Sheets

(56) References Cited

U.S. PATENT DOCUMENTS

| | | | |
|---|---|---|---|
| 7,646,737 B2* | 1/2010 | Shi | 370/310 |
| 7,920,846 B2* | 4/2011 | Wang | 455/411 |
| 2002/0164983 A1 | 11/2002 | Raviv et al. | |
| 2004/0151290 A1* | 8/2004 | Magarasevic et al. | 379/93.05 |
| 2005/0022012 A1 | 1/2005 | Bluestone et al. | |
| 2005/0260973 A1 | 11/2005 | van de Groenendaal | |
| 2006/0037071 A1* | 2/2006 | Rao | H04L 12/2856 726/13 |
| 2006/0258370 A1* | 11/2006 | Sudit et al. | 455/456.1 |
| 2007/0150946 A1 | 6/2007 | Hanberger et al. | |
| 2007/0180088 A1 | 8/2007 | Zhao | |

FOREIGN PATENT DOCUMENTS

| | | |
|---|---|---|
| JP | 2006-339847 A | 12/2006 |
| JP | 2007-503136 A | 2/2007 |
| WO | 2005/020002 | 3/2005 |
| WO | 2005/069532 A1 | 7/2005 |
| WO | 2007/099414 | 9/2007 |

OTHER PUBLICATIONS

"Secure Remote Access", 1999-2005, PortWise, p. 1.

"Using Point-to-Point Tunneling Protocol for Low-Cost, Secure, Remote Access across the Internet", retrieved at <<Using Point-to-Point Tunneling Protocol for Low-Cost, Secure, Remote Access across the Internet>>, on Jun. 25, 2008, pp. 15.

International Search Report and Written Opinion Received for PCT Application No. PCT/US2009/047268, dated Jan. 27, 2010, 11 pages.

CN Notice on the Third Office Action for Application No. 200980125626.2, dated Mar. 18, 2014.

CN Notice on the Fourth Office Action for Application No. 200980125626.2, dated Sep. 25, 2014.

CN Notice on the First Office Action for Application No. 200980125626. 2, dated Feb. 18, 2013.

CN Notice on the Second Office Action for Application No. 200980125626.2, dated Sep. 22, 2013.

CN Notice on the Second Office Action for Application No. 200980125626.2, dated Sep. 22, 2013, summary of the Second Office Action included.

EP Communication for Application No. 09770752.5-1862 / 2294868 PCT/US2009047268, Reference EP73239RK900kap, dated Jul. 30, 2014.

JP Notice of Reason for Rejection for Application No. 2011-516433, dated Sep. 2, 2013.

JP Final Decision for Rejection for Application No. 2011-516433, dated May 2, 2014.

"Fifth Office Action issued for China Patent Application No. 200980125626.2", dated Mar. 12, 2015, 11 Pages.

CN Decision on Rejection for Application No. 200980125626.2, dated Sep. 23, 2015.

JP Notice of Reason for Rejection for Application No. 2011-516433, dated Jun. 26, 2015.

* cited by examiner

SEAMLESS LOCATION AWARE NETWORK CONNECTIVITY

BACKGROUND

A corporation or the like (e.g., an enterprise) wants to give its personnel access to its network, including direct (local) and remote access. However, there are multiple considerations as to what type of access is allowed, depending on the location of the user, the user's identity, the security state (health) of the requesting device and so on.

In many organizations, more and more people need to work from various locations, sometimes temporarily, and sometimes or on a regular basis. Such locations include locally (within the company), home, a friend's personal computer, an Internet kiosk in an airport or hotel, a branch office, another company (e.g., partner or vendor), a wireless hotspot, and so forth.

In general, each of these locations has a different access method associated with it, such as full tunnel IPSec or SSL-VPN, Web Publishing, Terminal Service Gateway, and so forth. This makes it complicated for end users to connect, as each user needs to consider which method to use from each scenario, and remember what steps are needed to gain access.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a connection to a network (e.g., enterprise, corporate, public, home and so forth) is seamlessly made from the perspective of the user of a client device. Upon detecting a need for a connection to a network, location network reachability data corresponding to the client device location is determined, and used with policy information to obtain a list of available connection methods. An available connection method from the list is selected, and an attempt is made to establish a connection via that connection method. If the attempt fails, a different connection method is automatically selected for another attempt, and so on, until a connection method succeeds. Additional seamlessness is provided via a credentials vault, by which stored credentials are accessed and used in association with the access method.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards allowing users to seamlessly access a network, through a process that automatically detects a user's desire to access a network location, and automatically attempts to use an access method that is appropriate given the user's current location. Note that as used herein, "seamless" and the like does not mean that the user only has to indicate the network destination and never do anything else to gain access. For example, sometimes a user may have to insert a smartcard, type in credentials, and so forth, although stored credentials may be retrieved and automatically applied on behalf of the user, and such retrieved credentials may often succeed without needing further user participation.

In one aspect, a user indicates a desired destination, and transparent to the user, when the destination is a network location, an attempt to reach the destination occurs seamlessly. For example, the mechanisms described herein may traverse the following connectivity methods, one by one, until reaching availability:
1. Local area network.
2. Direct access (a future access method based upon IPSec encrypted communication between the client and the server, e.g., using IPv6 and on IPv6 transition technologies).
3. IPSec VPN (Internet protocol security-based virtual private network).
4. SSL VPN (secure sockets layer-based virtual private network).
5. Terminal services.
6. Web Publishing.

The logic may bypass an actual connection attempt based upon existing knowledge; for example, if known that a user is not connected via the LAN, the other access methods may be attempted, in order. Further, as part of this logic, the proper authentication method is used with each of the access methods. For example, if a specific access method requires the use of smart card authentication, and the user is trying to access the network from a location where smart card is not available (e.g., an internet kiosk), then the mechanisms revert to an access method that uses a less strict authentication method at the expense of a reduced access level.

While some of the examples described herein are directed towards various user locations and various access methods, it is understood that these are only examples. For example, other locations and/or ways to connect may be available, and other access methods including those not yet developed may be used in addition to or instead of one or more other access methods. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
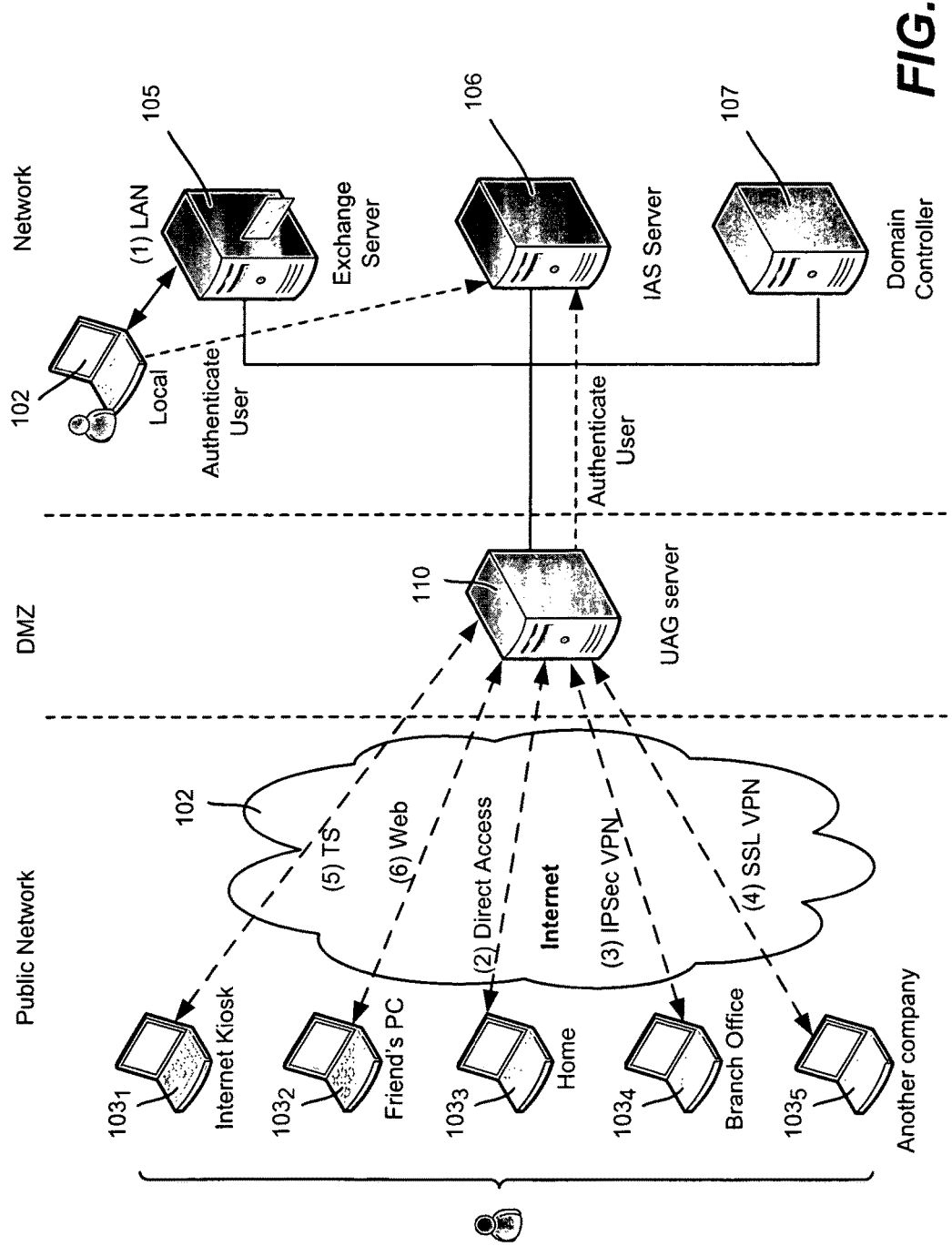
FIG. 1 is a block diagram representing an example client and server environment in which a user has a number of ways to access a network.

Turning to the drawings, FIG. 1 shows a number of example client/endpoint locations by which a user may attempt to access a network. These include (direct) access from a local location 102 via the LAN, or via the remote locations $103_1$-$103_5$ as exemplified in FIG. 1 over the Internet 104 or other intermediate network. Note that all of these remote locations $103_1$-$103_5$ may not be available to a given user, while other such remote locations may be available. Further, note that the access methods shown in FIG. 1 do not necessarily correspond to their location, e.g., a user at the home location 1033 may connect via any access methods (2)-(5).

In FIG. 1 the network is exemplified through an Exchange (email) server 105, an IAS (Internet Authentication Service) server 106 and a domain controller 107. It is understood that many other servers and/or types of servers may be present, in many various configurations.

For remote access, a unified access gateway server 110 is shown in this example network. Among other aspects, the unified access gateway server 110 is able to check the health of client endpoints, and via granular access, may differentiate users based on each user's identity and a health statement regarding their current client endpoint device's state, such as whether patches, antivirus software and so on are properly installed and updated.

Figure 2:
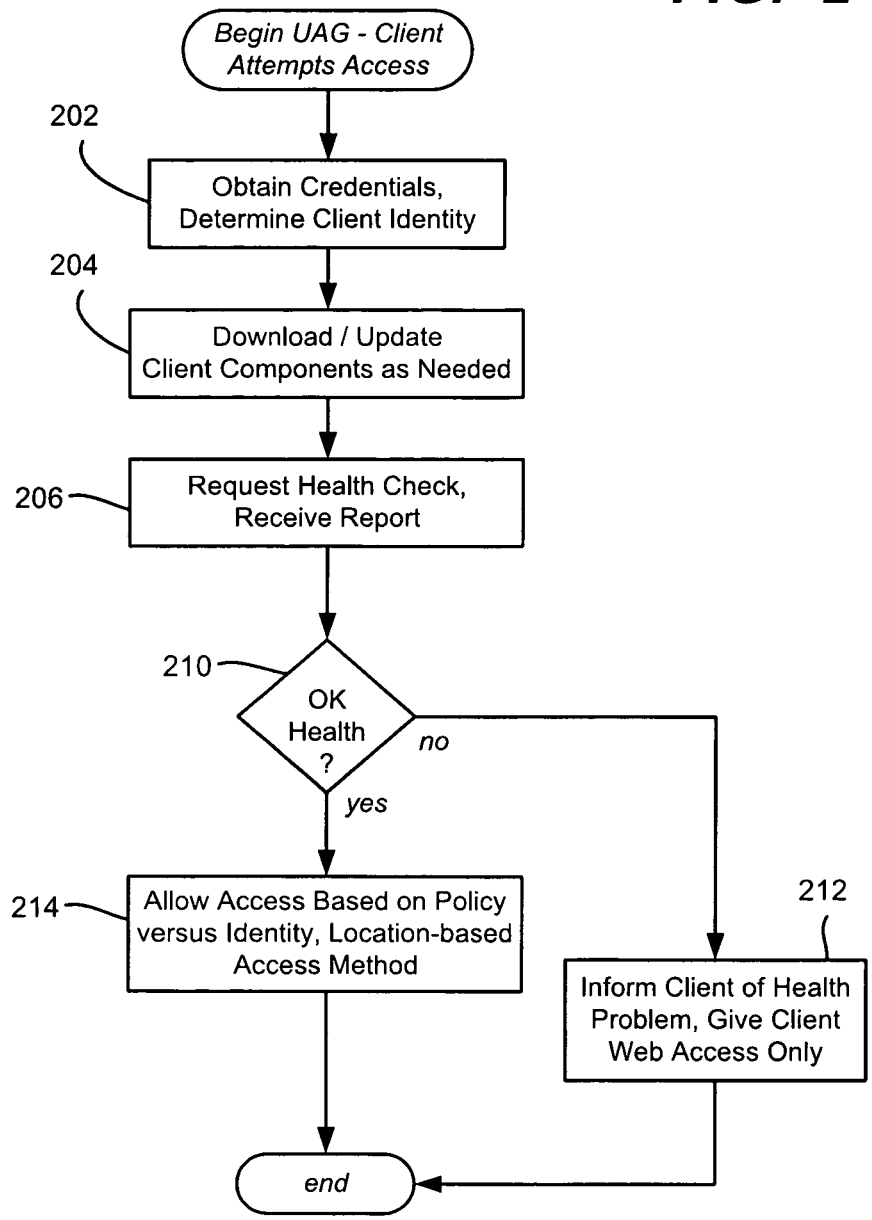
FIG. 2 is a block diagram representing example client components that may be used to provide seamless access to a network.

FIG. 2 shows example steps that may be taken by a unified access gateway server 110, beginning at step 202 where the server 110 obtains the client's credentials. For purposes of this example, it is assumed that the client user has valid credentials; invalid credentials may be handled in a known manner, e.g., some limited number of retry attempts are allowed and so forth.

Step 204 represents determining providing the client with any needed software, such as an agent that is used for health inspection, and/or the client components that are used for seamless network connectivity, as described below with reference to FIG. 3. Note that such components may be obtained in another manner. Further, if already present, these components may be verified and/or updated as well.

Step 206 represents requesting that the client perform a health check, e.g., run the agent, to receive a report. If the health is not good as evaluated by step 210, then the client access attempt is limited (or rejected). In the example of FIG. 2, the client is only able to see a web portal, and further, may obtain information as to why the health check failed (e.g., a security patch was not installed).

If the health check is good, step 214 allows access based on network policy. For example, the user's identity is one criterion that determines a level of access, and as described herein, an access level may be based on the access method in use, as some are more secure than others.

Figure 3:
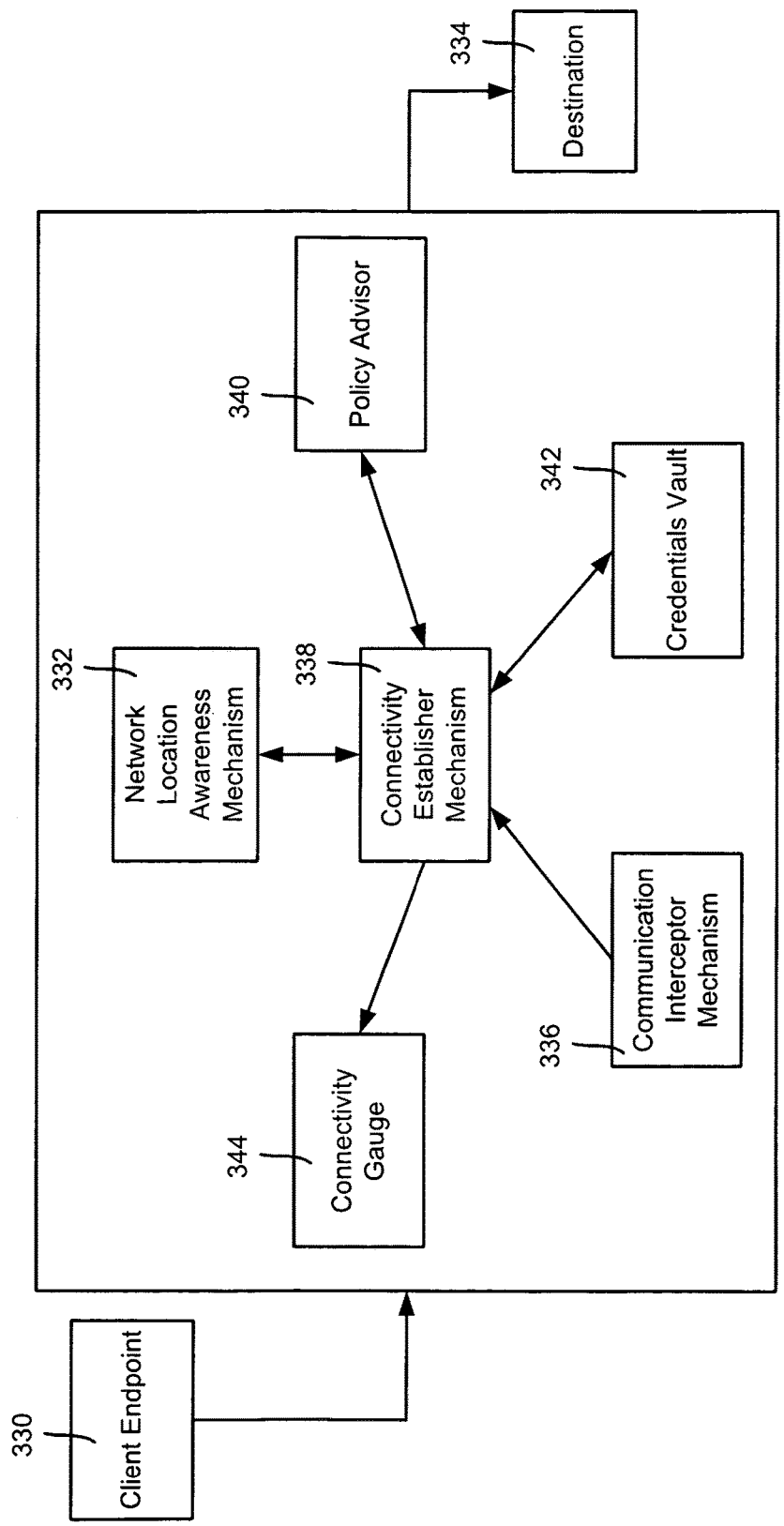
FIG. 3 is a flow diagram representing example steps taken by a gateway to determine remote access to a network.

FIG. 3 shows example components that a client endpoint 330 uses to provide seamless connectivity. A network location awareness mechanism 332 determines whether the device is located inside the LAN or outside of it.

When an outbound request is made to a destination 334, a communication interceptor mechanism 336 intercepts the communication and determines whether it is aimed towards an internal network resource. If so, and a connection is needed, the communication interceptor mechanism 336 communicates with a connectivity establisher mechanism 338 to direct that a connection be established.

The connectivity establisher mechanism 338 invokes a policy advisor 340 that advises what connectivity methods are available, based on the policy factors in conjunction with the actual location. Based on the available methods returned (e.g., in a listed order), connectivity establisher mechanism 338 accesses a credentials vault 342 that stores one or more sets of credentials to be used for establishing the connection.

The connectivity establisher obtains the appropriate credentials, and attempts to establish a connection to the network using one of the available and allowed methods. When connected, a connectivity gauge 344 indicates (e.g., via a user interface) the connectivity method in use and other available access methods.

Figure 4:
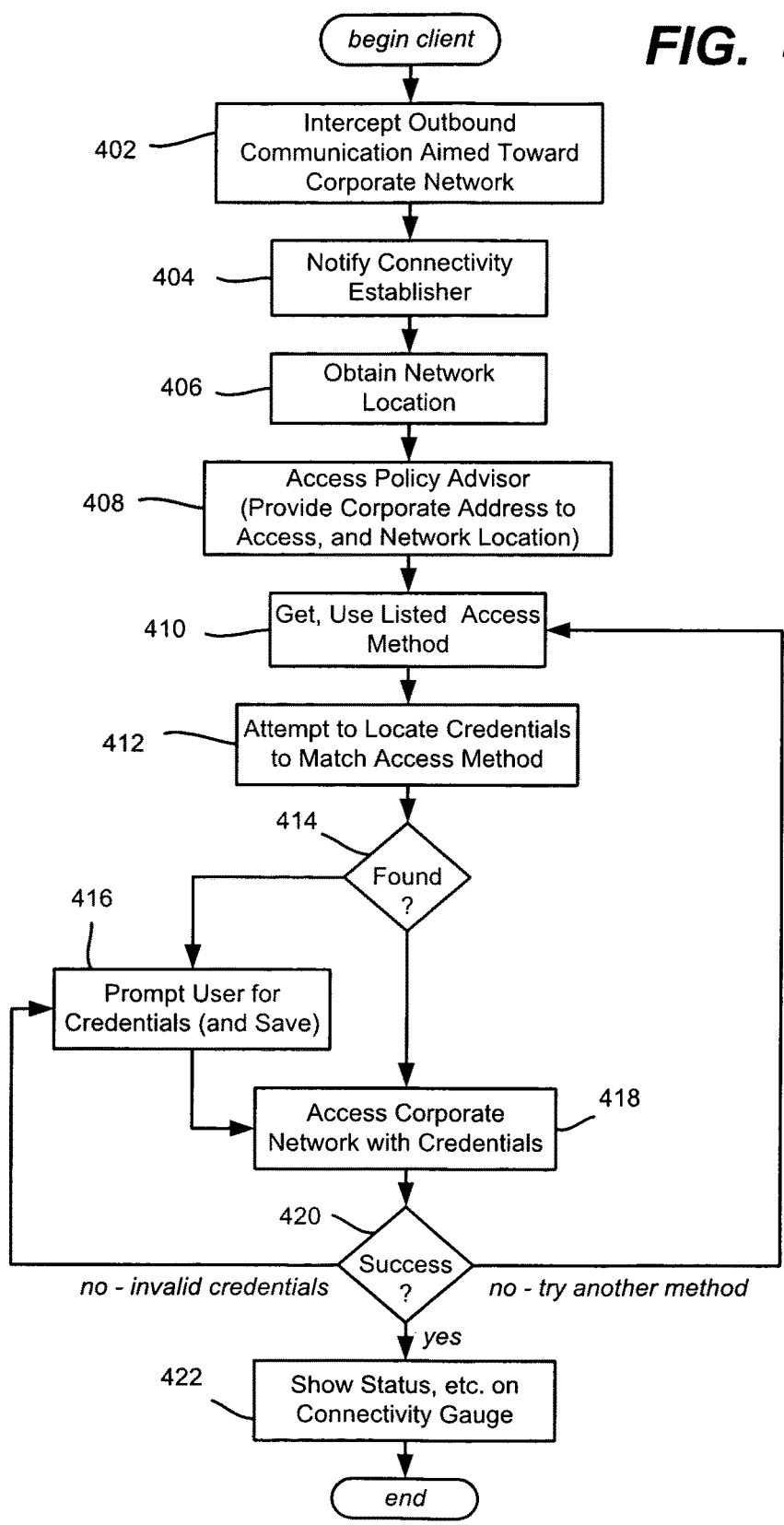
FIG. 4 is a flow diagram representing example steps taken by client components to provide seamless remote access to a network.

By way of example as generally represented in the flow diagram of FIG. 4, consider that at step 402 the communication interceptor mechanism 336 has just intercepted an outbound communication aimed toward the network. At step 404, the communication interceptor mechanism 336 notifies the connectivity establisher mechanism 338 of this event.

As represented via step 406, the connectivity establisher mechanism 338 consults with the network location awareness mechanism 332 in order to decide whether the endpoint is in the network or outside of it. Note that a further differentiation may be made between different remote endpoints, such as branch-office, home network, hotel, friend, kiosk and so forth in any event, location-based reachability data is returned. At step 408, the connectivity establisher mechanism 338 notifies the policy advisor 340 of the network address that the endpoint is trying to access, and also supplies the network location data. The policy advisor 340 returns with a list of allowed access methods, in order of precedence, as generally represented by step 410.

At step 412, the connectivity establisher mechanism 338 accesses the credentials vault 342 for the credentials that are required to establish a connection to the network. If such credentials do not exist (step 414), the user is prompted to enter credentials (step 416), which are also stored on the credentials vault 342 for future use. When obtained, the credentials are used in the access attempt at step 418.

If access does not succeed at step 420, it may be because the credentials were wrong, e.g., typed incorrectly if manually entered, or changed in some other way relative to those in the vault, e.g., via a different computer. If so, step 418 returns to step 416 to get the credentials.

Access also may not succeed because of the access method used. If so, step 418 returns to step 410 to get the next method on the list and attempt access with that method.

Once successful and the connectivity establisher mechanism 338 has verified a connection to the network, it indicates this state to the connectivity gauge 344, which in turn reflects the status to the user. This is represented via step 422.

Thus, to summarize the seamless connectivity operation, when the user (e.g., via an application) enters a destination address, the communication is intercepted. If identified as aimed toward an resource, the connectivity establisher mechanism 338 checks the network location and policy compliance, and starts attempting to establish connectivity. Once challenged with an authentication request, the connectivity establisher mechanism 338 accesses the credentials vault and authenticates of the user's behalf.

Seamless connectivity is thus achieved by making connectivity decisions based on the network location, the device's health and the security policy of the organization. Failure handling logic (built into step 420 of FIG. 4) reverts to the next possible connectivity method if the current method has failed.

Exemplary Operating Environment

Figure 5:
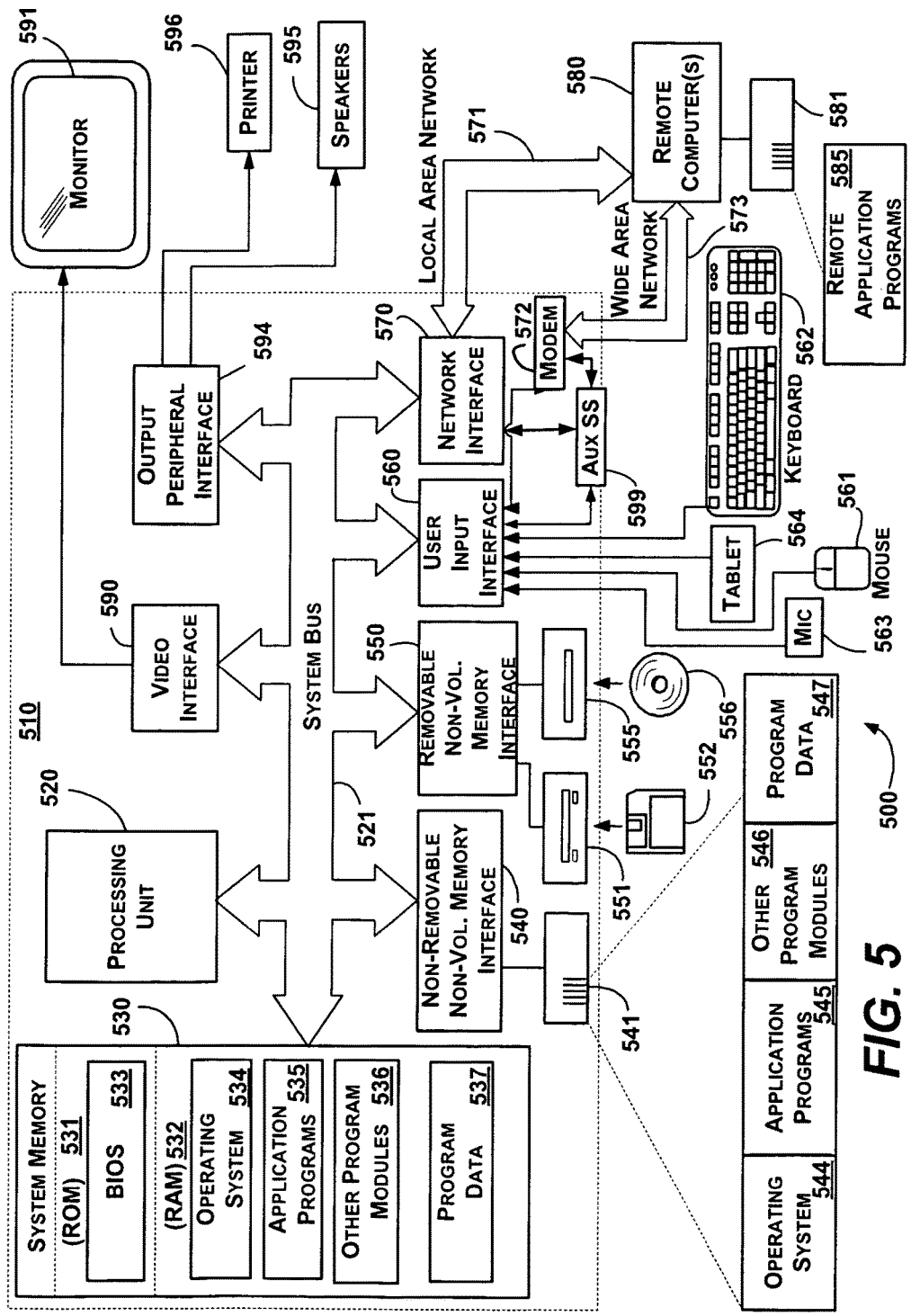
FIG. 5 shows an illustrative example of a computing environment into which various aspects of the present invention may be incorporated.

FIG. 5 illustrates an example of a suitable computing and networking environment 500 on which the examples and/or implementations of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, embedded systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 555 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 545 and program data 547. Note that these components can either be the same as or different from operating system 534, application programs 535, other program modules 535, and program data 537. Operating system 544, application programs 545, other program modules 545, and program data 547 are given different numbers herein to illustrate that, at a minimum, they are different copies. A user may enter commands and information into the computer 510 through input devices such as a tablet, or electronic digitizer, 554, a microphone 553, a keyboard 552 and pointing device 551, commonly referred to as mouse, trackball or touch pad. Other input devices not shown in FIG. 5 may include a joystick, game pad, satellite dish, scanner, or the like. These and other input devices are often connected to the processing unit 520 through a user input interface 550 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 595, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, -wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 550 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 550 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method performed on a computing device that includes at least one processor and memory, the method comprising:

intercepting, by the computing device from a client endpoint device of a user, an outgoing communication directed to a destination network;

determining, by the computing device based on a location of the client endpoint device and on a location of the destination network, access methods that are each configured for establishing a connection between the client endpoint device and the destination network on behalf of the user;

establishing, by the computing device via a first of the access methods, the connection between the client endpoint device and the destination network on behalf of the user; and verifying, by the computing device, the connection between the client endpoint device and the destination network.

2. The method of claim 1 where one of the access methods is based on Local Area Network ("LAN") functionality.

3. The method of claim 1 where the determining is further based on policy associated with the destination network.

4. The method of claim 1 where one of the access methods is based on Internet Protocol Security ("IPSec") functionality.

5. The method of claim 1 further comprising indicating, in response to the verifying, connectivity via the access method used in the establishing.

6. The method of claim 1 where one of the access methods is based on Terminal Services ("TS") functionality.

7. The method of claim 1 where one of the access methods is based on Virtual Private Network ("VPN") functionality.

8. At least one computer storage device comprising computer-executable instructions that, based on by a computing device that includes at least one processor and memory, configure the computing device to perform actions comprising:

intercepting, by the computing device from a client endpoint device of a user, an outgoing communication directed to a destination network;

determining, by the computing device based on a location of the client endpoint device and on a location of the destination network, access methods that are each configured to establish a connection between the client endpoint device and the destination network on behalf of the user;

establishing, by the computing device via a first of the access methods, the connection between the client endpoint device and the destination network on behalf of the user; and verifying, by the computing device in response to the attempting succeeding or, the connection between the client endpoint device and the destination network.

9. The at least one computer storage device of claim 8 where one of the access methods is based on Local Area Network ("LAN") functionality.

10. The at least one computer storage device of claim 8 where the determining is further based on policy associated with the destination network.

11. The at least one computer storage device of claim 8 where one of the access methods is based on Internet Protocol Security ("IPSec") functionality.

12. The at least one computer storage device of claim 8, the actions further comprising indicating, in response to the verifying, connectivity via the access method used in the establishing.

13. The at least one computer storage device of claim 8 where one of the access methods is based on Terminal Services ("TS") functionality.

14. The at least one computer storage device of claim 8 where one of the access methods is based on Virtual Private Network ("VPN") functionality.

15. A computing device comprising:
   at least one processor;
   memory coupled to the at least ne processor;
   a communication interceptor mechanism implemented at least in part by the at least one processor and configured to intercept, from a client endpoint device of a user, an outgoing communication directed to a destination network;
   a policy advisor implemented at least in part by the at least one processor and configured to determine obtaining, based on a location of the client endpoint device and on a location of the destination network, access methods that are each configured to establish a connection between the client endpoint device and the destination network on behalf of the user;
   a connectivity establisher mechanism implemented at least in part by the at least one processor and configured to establish, via a first of the access methods, the connection between the client endpoint device and the destination network on behalf of the user; and
   the connectivity establisher mechanism further configured to verify the connection between the client endpoint device and the destination network.

16. The computing device of claim 15 where one of the access methods is based on Local Area Network ("LAN") functionality.

17. The computing device of claim 15 where the access methods are determined based on policy associated with the destination network.

18. The computing device of claim 15 where one of the access methods is based on Internet Protocol Security ("IPSec") functionality.

19. The computing device of claim 15, the actions further comprising indicating, in response to the verifying, connectivity via the access method used to establish the connection.

20. The computing device of claim 15 where one of the access methods is based on Terminal Services ("TS") functionality or on Virtual Private Network ("VPN") functionality.

* * * * *